(12) United States Patent
Chaudhary et al.

(10) Patent No.: US 8,802,988 B2
(45) Date of Patent: *Aug. 12, 2014

(54) ACETYLATED DERIVATIVES OF CASTOR OIL AND THEIR BLENDS WITH EPOXIDIZED FATTY ACID ESTERS

(75) Inventors: Bharat I. Chaudhary, Princeton, NJ (US); Beate Sczekalla, Halle (DE); Michael Meerbote, Gutenberg (DE); Yang Cheng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/498,745

(22) PCT Filed: Sep. 29, 2010

(86) PCT No.: PCT/US2010/050676
§ 371 (c)(1),
(2), (4) Date: Mar. 28, 2012

(87) PCT Pub. No.: WO2011/041380
PCT Pub. Date: Apr. 7, 2011

(65) Prior Publication Data
US 2012/0181061 A1    Jul. 19, 2012

Related U.S. Application Data

(60) Provisional application No. 61/247,383, filed on Sep. 30, 2009.

(51) Int. Cl.
*H01B 7/00* (2006.01)
*C08K 5/00* (2006.01)
*C08K 5/10* (2006.01)
*H01B 3/44* (2006.01)

(52) U.S. Cl.
CPC .............. *C08K 5/10* (2013.01); *C08K 5/0016* (2013.01); *H01B 3/443* (2013.01)
USPC ............ 174/110 V; 174/110 SR; 428/35.8; 428/375; 428/463

(58) Field of Classification Search
USPC ........ 524/310; 174/110 V, 110 SR; 428/35.8, 428/375, 463
See application file for complete search history.

(56) References Cited

U.S. PATENT DOCUMENTS

| | | | |
|---|---|---|---|
| 2,397,592 A | 4/1946 | Blades | |
| 2,403,215 A | 7/1946 | Foster | |
| 2,458,484 A | 1/1949 | Terry et al. | |
| 2,618,622 A | 11/1952 | Grummit et al. | |
| 2,666,752 A | 1/1954 | Grummit et al. | |
| 3,138,566 A | 6/1964 | Arnold | |
| 3,409,580 A * | 11/1968 | Alzner et al. | 524/251 |
| 3,639,318 A | 2/1972 | Tijunelis et al. | |
| 3,668,091 A | 6/1972 | French et al. | |
| 3,712,875 A | 1/1973 | Tijunelis | |
| 3,778,465 A | 12/1973 | Barnstorf | |
| 3,780,140 A | 12/1973 | Hammer | |
| 3,868,341 A | 2/1975 | Sauer et al. | |
| 3,872,187 A | 3/1975 | Fath | |
| 3,891,694 A | 6/1975 | Mills et al. | |
| 4,083,816 A | 4/1978 | Frankel et al. | |
| 4,346,145 A | 8/1982 | Choi et al. | |
| 4,421,886 A | 12/1983 | Worschech | |
| 4,426,477 A | 1/1984 | Yasumatsu et al. | |
| 4,556,694 A | 12/1985 | Wallace | |
| 4,605,694 A | 8/1986 | Walker | |
| 4,612,192 A | 9/1986 | Scheuffgen et al. | |
| 4,613,533 A | 9/1986 | Loomis et al. | |
| 4,627,993 A | 12/1986 | Loomis | |
| 4,670,494 A | 6/1987 | Semenza, Jr. | |
| 4,857,600 A | 8/1989 | Gross et al. | |
| 5,225,108 A | 7/1993 | Bae et al. | |
| 5,227,417 A | 7/1993 | Kroushl | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofman | |
| 5,466,267 A | 11/1995 | Baillargeon et al. | |
| 5,495,033 A | 2/1996 | Basu et al. | |
| 5,575,965 A | 11/1996 | Caronia et al. | |
| 5,736,605 A | 4/1998 | Oshima | |
| 5,756,570 A | 5/1998 | Hoch et al. | |

(Continued)

FOREIGN PATENT DOCUMENTS

| | | |
|---|---|---|
| CA | 1188445 | 6/1985 |
| CN | 1341681 A | 3/2002 |

(Continued)

OTHER PUBLICATIONS

Danisco, Grindsted Soft-n-Safe brochure (date unknown).
Vertellus Performance Materials Inc.; Flexricin P-8 Technical Data Sheet, Nov. 2006.
Grummitt et al., Acetylated Castor Oil Industrial and Engineering Chemistry, vol. 37, No. 5, May 1945, pp. 485-491.
Orellana-Coca et al., Journal of Molecular Catalysis B: Enzymatic 44 (2007) 133-137.
Du et al., JAOCS, vol. 81, No. 4 (2004) 477-480.
Sheehan et al, A Look Back at the U.S. Department of Energy's Aquatic Species Program: Biodiesel from Algae, National Renewable Energy Laboratory, Colorado, Jul. 1998, pp. 1-294.
Greenspan et al., Industrial and Engineering Chemistry, 445(12), 1953, pp. 2722-2726.

(Continued)

*Primary Examiner* — Peter Szekely
(74) *Attorney, Agent, or Firm* — Whyte Hirschboeck Dudek S.C.

(57) ABSTRACT

The present disclosure is directed to acetylated castor components and compositions including the same. The acetylated castor component may be an acetylated castor oil and/or an acetylated castor wax. The acetylated castor component may be blended with an epoxidized fatty acid ester. The present acetylated castor components and blends find advantageous application as a plasticizer.

15 Claims, 1 Drawing Sheet

(56) References Cited

U.S. PATENT DOCUMENTS

| | | | |
|---|---|---|---|
| 5,886,072 | A | 3/1999 | Linsky et al. |
| 6,063,846 | A | 5/2000 | Weng et al. |
| 6,114,425 | A | 9/2000 | Day et al. |
| 6,274,750 | B1 | 8/2001 | Sato et al. |
| 6,417,260 | B1 | 7/2002 | Weng et al. |
| 6,437,170 | B1 | 8/2002 | Thil et al. |
| 6,451,958 | B1 | 9/2002 | Fan et al. |
| 6,496,629 | B2 | 12/2002 | Ma et al. |
| 6,608,142 | B1 | 8/2003 | Weng et al. |
| 6,706,815 | B2 | 3/2004 | Marchand et al. |
| 6,714,707 | B2 | 3/2004 | Rossi et al. |
| 6,734,241 | B1 | 5/2004 | Nielsen et al. |
| 6,797,753 | B2 | 9/2004 | Benecke et al. |
| 6,849,694 | B2 | 2/2005 | Hata |
| 6,949,597 | B2 | 9/2005 | Nielsen et al. |
| 7,700,675 | B2 | 4/2010 | Bueno de Almeida et al. |
| 2002/0013396 | A1 | 1/2002 | Benecke et al. |
| 2004/0122159 | A1 | 6/2004 | Mhetor et al. |
| 2005/0090590 | A1 | 4/2005 | Nielsen et al. |
| 2005/0203230 | A1 | 9/2005 | Kadakia et al. |
| 2006/0025544 | A1 | 2/2006 | Koube et al. |
| 2006/0276575 | A1 | 12/2006 | Hamaguchi et al. |
| 2007/0100049 | A1 | 5/2007 | Ishizuka et al. |
| 2007/0135562 | A1 | 6/2007 | Freese et al. |
| 2008/0200595 | A1 | 8/2008 | Hinault et al. |
| 2008/0227993 | A1 | 9/2008 | Zuckerman |
| 2009/0149585 | A1 | 6/2009 | DeQuadros, Jr. et al. |
| 2009/0149586 | A1 | 6/2009 | DeQuadros, Jr. et al. |
| 2009/0312478 | A1 | 12/2009 | Hasegawa et al. |
| 2010/0010127 | A1 | 1/2010 | Barki et al. |
| 2010/0256278 | A1 | 10/2010 | Harada et al. |
| 2011/0076502 | A1 | 3/2011 | Chaudhary et al. |
| 2011/0272174 | A1 | 11/2011 | Chaudhary et al. |
| 2013/0005937 | A1 | 1/2013 | Cramail et al. |

FOREIGN PATENT DOCUMENTS

| | | |
|---|---|---|
| CN | 101070510 | 11/2007 |
| CN | 101108982 | 1/2008 |
| CN | 101591588 | 12/2009 |
| CN | 101824193 | 9/2010 |
| CN | 101914219 | 12/2010 |
| EP | 0192961 A1 | 9/1986 |
| EP | 0358179 A2 | 3/1990 |
| EP | 0364717 A1 | 4/1990 |
| EP | 0393813 A1 | 10/1990 |
| EP | 0473915 A1 | 3/1992 |
| EP | 0565984 A1 | 10/1993 |
| EP | 1361039 | 11/2003 |
| EP | 0986606 B1 | 8/2004 |
| EP | 1218443 | 10/2005 |
| EP | 1624014 | 8/2006 |
| EP | 2070977 A2 | 6/2009 |
| EP | 2245089 A1 | 5/2012 |
| FR | 1437722 | 5/1966 |
| GB | 499931 | 1/1939 |
| GB | 790314 | 2/1958 |
| GB | 910543 | 11/1962 |
| GB | 934689 | 8/1963 |
| GB | 1022920 | 3/1966 |
| GB | 1102506 | 2/1968 |
| GB | 1300526 | 12/1972 |
| GB | 1341623 | 12/1973 |
| GB | 1415770 | 11/1975 |
| GB | 2155021 | 9/1985 |
| JP | S61-016950 | 1/1986 |
| JP | 04-059851 | 2/1992 |
| JP | H04-085354 | 3/1992 |
| JP | H04-261452 | 9/1992 |
| JP | 2000-319468 | 11/2000 |
| JP | 2003-064233 | 3/2003 |
| JP | 2003-297149 | 10/2003 |
| JP | 2004-311064 | 11/2004 |
| JP | 2010-042669 | 2/2010 |
| WO | 9730115 | 8/1997 |
| WO | 0114466 | 3/2001 |
| WO | 01/98404 | 12/2001 |
| WO | 2004/052977 | 6/2004 |
| WO | 2007/006489 | 1/2007 |
| WO | 2008/081330 | 7/2008 |
| WO | 2008/081332 | 7/2008 |
| WO | 2008/122364 A1 | 10/2008 |
| WO | 2009/102877 | 8/2009 |
| WO | 2011/041372 | 4/2011 |
| WO | 2011/041380 | 4/2011 |
| WO | 2011/041388 | 4/2011 |
| WO | 2013/003225 A2 | 1/2013 |

OTHER PUBLICATIONS

Thomson Scientific, Mar. 13, 2009, London, GB.
Greenspan et al., The Journal of the American Oil Chemists Society, 33, 1956, pp. 391-394.
Gan et al., European Polymer Journal, 31(8), 1994, pp. 719-724.
Rehberg et al., Ind. Eng. Chem., 44(9) 1952, pp. 2191-2195.
Taylor, Proceedings of the World Conference on Oilseed Technology and Utilization, American Oil Chemists Society, Champaign, 1992, pp. 152-165.
Tekin et al., JAOCS, 77(3), 2000, pp. 281-283.
Cai et al., Eur. J. Lipid Sci., Technol., 2008, 110, pp. 341-346.
Campanella et al., Chemical Engineering Journal, 144 (2008), pp. 466-475.
Santacesara et al, Chemical Engineering Journal, vol. 173, Issue 1, Sep. 1, 2011, pp. 198-209.
Senzana et al, Journal of the Americal Oil Chemists Society, vol. 78, No. 7 (2001), pp. 725-731.
Haas, Fuel Processing Technology 86, 2005, pp. 1087-1096.
Freedman et al., JAOCS, 63(10), 1986, pp. 1375-1380.
Morgenstern, B., Use of Modified Fatty Acid Esters as Plasticizers for PVC dated Sep. 12, 2003.
Morgenstern, B., Epoxidized Fatty Acid Esters as Plasticizers for PVC dated Apr. 22, 2005.
Morgenstern, B., Epoxidized Fatty Acid Esters as Plasticizers for PVC, presented at the 7th Freiberg Polymer Conference, Apr. 21 and 22, 2005.
Opposition filed against EP2245089 dated Jan. 9, 2013.
http://hebjingu.en.alibaba.com.
http://en.wikipedia.org/wiki/Chlorine.
http://en.wikipedia.org/wiki/Bleaching_of_wood_pulp.
TIC America, Online catalog: Tributrin; http://web.archive.org/web/20080511154307/http://www.tciamerica.com/.
International Search Report and Written Opinion of PCT/US2009/033935 dated May 18, 2009.
International Preliminary Report on Patentability of PCT/US2009/033935 dated Aug. 26, 2010.
International Search Report and Written Opinion of PCT/US2010/050654 dated Nov. 9, 2010.
International Search Report and Written Opinion of PCT/US2010/050676 dated Jan. 12, 2011.
International Preliminary Report on Patentability of PCT/US2011/041557 dated Aug. 31, 2012.
International Search Report and Written Opinion of PCT/US2011/041557 dated Sep. 5, 2011.
International Preliminary Report on Patentability of PCT/US2011/050690 dated Jan. 12, 2012.
International Search Report and Written Opinion of PCT/US2010/050690 dated Feb. 8, 2011.
International Search Report and Written Opinion of PCT/US2011/045653 dated Oct. 7, 2011.
International Search Report and Written Opinion of PCT/US2012/043740 dated Jan. 23, 2013.
International Search Report and Written Opinion of PCT/US2012/055070 dated Dec. 3, 2012.

(56) References Cited

OTHER PUBLICATIONS

International Search Report and Written Opinion of PCT/US2013/023362 dated Mar. 28, 2013.

International Search Report and Written Opinion of PCT/US2010/050699 dated Nov. 8, 2010.

International Search Report and Written Opinion of PCT/US2011/035143 dated Aug. 26, 2011.

* cited by examiner

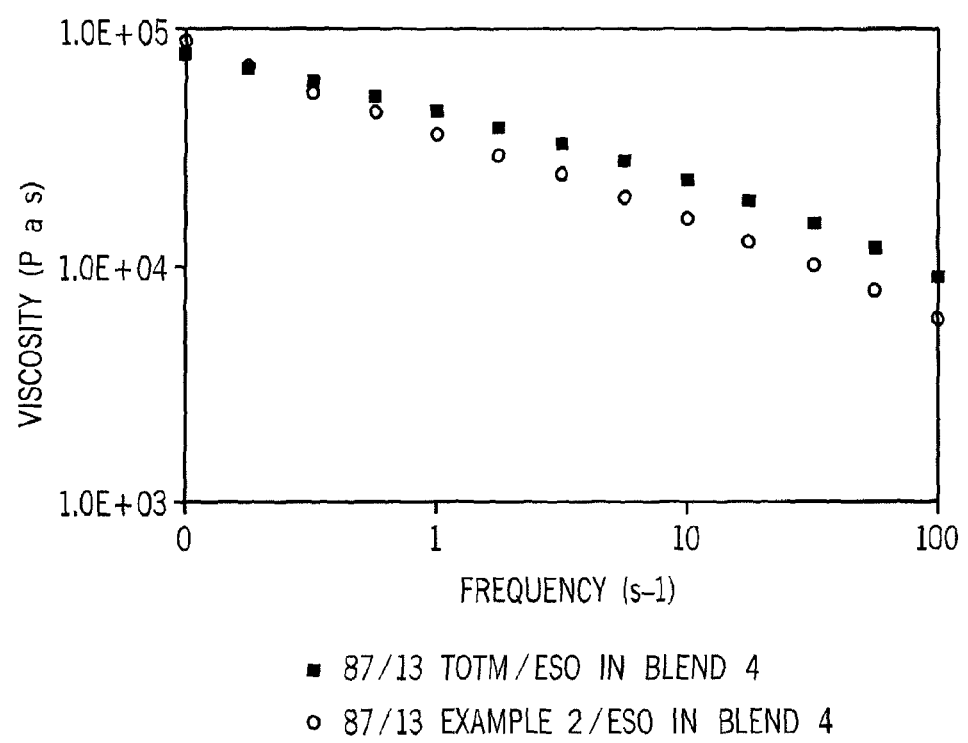

ACETYLATED DERIVATIVES OF CASTOR OIL AND THEIR BLENDS WITH EPOXIDIZED FATTY ACID ESTERS

PRIORITY

This application claims priority to U.S. patent application No. 61/247,383 filed on Sep. 30, 2009, the entire content of which is incorporated by reference herein.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixtures of plasticizers are often used to obtain optimum properties.

Phthalate plasticizers have recently come under intense scrutiny by public interest groups that are concerned about the negative environmental impact of phthalates and potential adverse health effects in humans (especially children) exposed to phthalates.

Consequently, a need exists for phthalate-free plasticizers for polymer resins. A need further exists for phthalate-free plasticized polymers that have the same, or substantially the same, chemical, mechanical, and/or physical properties as polymers containing phthalate plasticizers.

SUMMARY

The present disclosure is directed to acetylated castor components and compositions composed of the same. A nonlimiting beneficial application for the present acetylated castor components is as a plasticizer.

In an embodiment, an acetylated castor oil is provided. The acetylated castor oil has a hydroxyl number from 0 to less than 5 as measured in accordance with DIN 53402.

In an embodiment, an acetylated castor wax is provided. The acetylated castor wax has a viscosity less than 2000 m Pa s as measured in accordance with ASTM D445 at 25° C.

The present disclosure provides a composition. The composition may include one, two, three, or more plasticizers. In an embodiment, the composition comprises a first plasticizer and a second plasticizer. The first plasticizer includes the acetylated castor component. The second plasticizer includes one or more other plasticizers including, but not limited to, an epoxidized fatty acid ester. The acetylated castor component can be an acetylated castor oil, an acetylated castor wax, and combinations thereof.

In an embodiment, a polymeric composition is provided. The polymeric composition comprises a polymeric resin and a plasticizer composition containing one, two, three, or more plasticizers. The plasticizer composition comprises an acetylated castor component and optionally one or more other plasticizers including, but not limited to, an epoxidized fatty acid ester.

In an embodiment, a coated conductor is provided. The coated conductor comprises a conductor and a coating on the metal conductor. The coating comprises a polymeric resin and a plasticizer composition containing one, two, three, or more plasticizers. The plasticizer includes a first plasticizer and optionally a second plasticizer. The first plasticizer includes the acetylated castor component. The second plasticizer contains one or more other plasticizers including, but not limited to, an epoxidized fatty acid ester.

An advantage of the present disclosure is an environmentally safe plasticizer for polymer resins.

An advantage of the present disclosure is a phthalate-free plasticizer with low, or no, adverse health risk to humans.

An advantage of the present disclosure is a phthalate-free plasticizer which provides the same, or substantially the same, properties to a polymer resin as the same polymer resin containing a phthalate-containing plasticizer.

An advantage of the present disclosure is a coating for wire and cable that is phthalate-free.

BRIEF DESCRIPTION OF THE DRAWINGS

FIG. 1 is a plot showing the shear dependent viscosity for a comparative sample and a composition in accordance with an embodiment of the present disclosure.

DETAILED DESCRIPTION

The present disclosure is directed to acetylated castor components and compositions including the same. The compositions provided herein are suitable for use as plasticizers in polymer resins and vinyl chloride resins in particular.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of U.S. patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the composition and/or coating, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometallic compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Blend," "polymer blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and copolymers.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

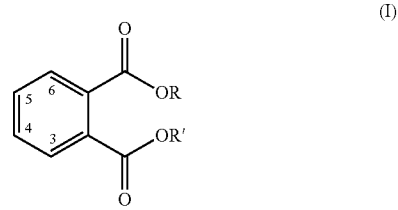

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl- groups. Each position 3, 4, 5, and 6 may be populated by hydrogen or other moiety.

In an embodiment, an acetylated castor component is provided. A "castor component," as used herein, is a castor oil, a castor wax, or a mixture thereof. The term "castor oil" is a pale yellow-to-colorless viscous liquid obtained from the castor bean/seed of the castor plant *Ricinus communis*. Castor oil is a triglyceride in which from about 85 wt % to about 95 wt % of the fatty acid chains are ricinoleic acid. A "fatty acid," as used herein, is a monocarboxylic acid composed of an aliphatic chain containing 4 to 22 carbon atoms with a terminal carboxyl group (COOH). The fatty acid can be saturated or unsaturated, branched or unbranched, and may or may not include one or more hydroxyl group(s).

A nonlimiting compositional representation of castor oil is provided at Representation (II) below.

Compositional Representation of Castor Oil (II)

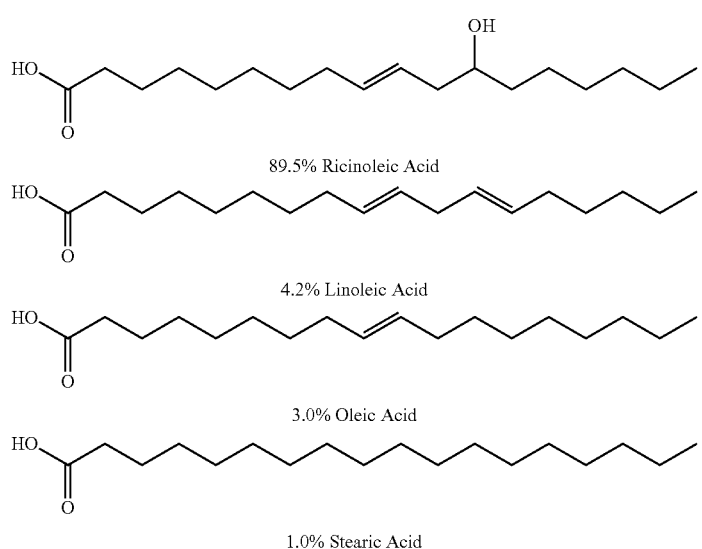

-continued

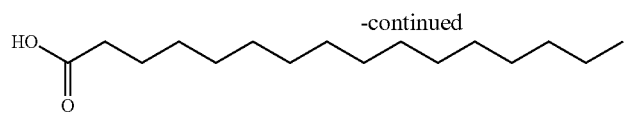
1.0% Palmitic Acid

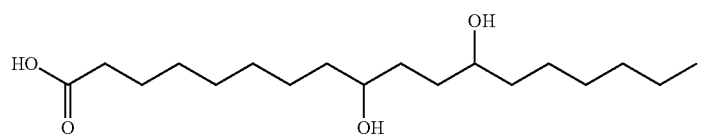
0.7% Dihydroxystearic Acid

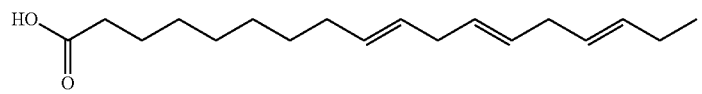
0.3% Linolenic Acid

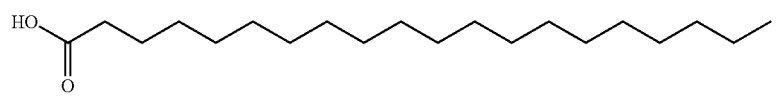
0.3% Eicosanoic Acid

Wt % based on total weight of the castor oil

The term "castor wax" is hydrogenated castor oil, and is a hard, brittle, high melting point wax with about 40 wt % to about 95 wt % glyceryl trihydroxystearate. It is produced by the hydrogenation of castor oil, typically in the presence of a nickel catalyst. Castor wax is odorless and is insoluble in water. Castor wax may be partially or fully hydrogenated castor oil.

The castor component is acetylated. The term "acetylating" or "acetylation," as used herein, is the process of introducing an acetyl group into the molecule of a compound having —OH groups. In other words, acetylation replaces H of the —OH groups with $CH_3CO$— groups. Acetylation may also occur with a fatty acid moiety having a hydroxyl group (i.e., the —OH group at $C_{12}$ of the ricinoleic acid moiety of a glyceride). Nonlimiting examples of suitable acetylation reagents include acetic anhydride and acetyl chloride. Thus, an "acetylated castor component" (or "ACC") is a castor component that has been subjected to an acetylation reaction. In particular, the acetylated castor component may be an acetylated castor oil ("ACO") or an acetylated castor wax ("ACW") or mixtures thereof. The ACW may be fully or partially hydrogenated. Nonlimiting examples of ACO and ACW are Flexricin® P-8 (product of Vertellus) and Paricin® 8 (product of Vertellus), respectively.

Some, substantially all, or all, of the —OH groups of the castor component may be acetylated. The acetylation results in an acetylated castor component having a lower hydroxyl number than the castor component, including from 0 to less than 15, or from 0 to less than 10, or from 0 to less than 5, or 0 to less than 2, or 0.

In an embodiment, the castor component is composed solely of glyceryl trihydroxystearate. Consequently, the ACC may be acetylated glyceryl trihydroxystearate. In one embodiment, the acetylated glyceryl trihydroxystearate has a hydroxyl number from 0 to less than 15, or from 0 to less than 10, or from 0 to less than 5, or from 0 to less than 2, or 0. In another embodiment, the acetylated glyceryl trihydroxystearate has a viscosity from about 100 mPa s to less than about 2000 mPa s at 25° C.

Nonlimiting properties for the castor components and nonlimiting embodiments of the present acetylated castor component are provided in Table 1 below.

TABLE 1

| Properties | Castor Oil | Acetylated Castor Oil (ACO) | Castor Wax | Acetylated Castor Wax (ACW) |
|---|---|---|---|---|
| Melting Point (° C.) | Liq @ RT | Liq @ RT | 60-87 | Liq @ RT |
| Density (g/cc) at 25° C. | 0.945-0.965 | 0.950-0.960 | solid | 0.950-0.960 |
| Acid number (mg KOH/g) | <3 | 1-8 | <3 | 1-8 |
| Iodine value (g$I_2$/100 g) | 82-90 | ≥40 | <45 | <40 |
| Hydroxyl Number (mg KOH/g) | 150-175 | 0 to less than 5 | 150-175 | 0 to less than 15 |
| Viscosity mPas (@ 25 C.) | 600-900 | 50 to less than 1000 | | 100 to less than 2000 |

Applicants have surprisingly discovered that reduced viscosity of the acetylated castor component results in improved plasticizer compositions.

Complete, or substantially complete, acetylation of the ACC yields a liquid plasticizer composition with a viscosity suitable for use with polymeric resins and vinyl chloride resins in particular. In an embodiment, Applicants have surprisingly discovered a liquid ACW with a viscosity from about 100 mPa s to less than about 2000 mPa s at 25° C. In another embodiment, the ACW has a hydroxyl number from 0 to less than 15. In a further embodiment, the ACW may also have an iodine number of 0 to less than 40 g $I_2$/100 g.

Applicants also have discovered a liquid ACO with a hydroxyl number from 0 to less than 5 which has a viscosity from about 50 mPa s to less than 1000 mPa s at 25° C. The ACO may also have an iodine number from about 40 g $I_2$/100 g to about 90 g $I_2$/100 g.

In an embodiment, the acetylated castor component has an acid number from about 0 mg KOH/g to about 8 mg KOH/g.

In an embodiment, the acetylated castor component has an APHA color from about 0 to about 3000, or from about 0 to about 1000, or from about 0 to about 500.

The grade of castor oil or castor wax used for acetylation has an effect on the color of the ACC, as well as the amount of insolubles formed at temperatures below 40° C. In general, the lower the temperature, the more insolubles are formed. Different grades of castor oil or castor wax can result in significantly different color and amount of insolubles, even when the conditions during acetylation are identical.

Any known grade of castor oil can be used to make the ACC (or the hydrogenated castor oil that is used to make the ACC) including, but not limited to, Commercial Grade/Industrial Grade Castor Oil (produced by crushing steam cooked castor seeds in expeller and filtering the collected oil to remove physical impurities); First Special Grade Refined Castor Oil (produced by bleaching Commercial Grade Castor Oil, using bleaching earth and activated carbon to reduce colour, free fatty acid content and moisture content, and filtration); Pale Pressed Grade Refined Castor Oil (a premium product produced from the first pressing of the castor seed that is pale yellow viscous liquid in appearance and free from suspended matter, light in colour and low in acidity); Pharma Grade Castor Oil (produced by first pressing of castor seed, without losing medicinal qualities); Cold Pressed Castor Oil (pure virgin transparent castor oil extracted in its natural form by pressing seeds without using steam cooking); and Dehydrated Castor Oil; and Blown Castor Oil (produced by oxidizing castor oil under thermally controlled condition). The foregoing grades of castor oil are available from Keloth Oleochem Pvt., Ltd., Gujarat, India.

In an embodiment, the castor wax is recrystallized from solvents such as ethyl acetate or acetone before use in the acetylation reaction. Re-crystallization of castor wax results in an ACC product that is desirably lighter in color and which can also have desirably less insoluble components.

Applicants have surprisingly and unexpectedly discovered an acetylated castor component with (i) a low hydroxyl number, (ii) a low viscosity, and optionally (iii) a low iodine number which yields a plasticizer with excellent compatibility when added to polymeric resins (and vinyl chloride resins in particular). The present ACC is phthalate-free and provides a plasticizer that replicates all, or substantially all, the properties afforded by phthalate-based plasticizers.

The acetylated castor component may comprise two or more embodiments disclosed herein.

The present disclosure provides a composition that may include one, two, three, or more plasticizers. In an embodiment, a composition is provided and includes a first plasticizer and a second plasticizer. The first plasticizer includes the ACC. The second plasticizer includes one or more other plasticizer. In an embodiment, the composition includes a blend of (i) the ACC (first plasticizer) and (ii) one or more epoxidized fatty acid ester (EFA) (second plasticizer). The ACC may be any ACC (i.e., any ACO, any ACW, and combinations thereof) as disclosed above with no limit regarding hydroxyl number and/or viscosity. The term "epoxidized fatty acid ester," as used herein, is a compound with at least one fatty acid moiety which contains at least one epoxide group. An "epoxide group" is a three-membered cyclic ether (also called oxirane or an alkylene oxide) in which an oxygen atom is joined to each of two carbon atoms that are already bonded to each other. Nonlimiting examples of suitable epoxidized fatty acid esters include epoxidized animal and vegetable oils, such as naturally occurring epoxidized oils, epoxidized soybean oil (ESO), epoxidized propylene glycol dioleate, epoxidized corn oil, epoxidized sunflower oil, epoxidized palm oil, epoxidized linseed oil, epoxidized canola oil, epoxidized rapeseed oil, epoxidized safflower oil, epoxidized tall oil, epoxidized tung oil, epoxidized fish oil, epoxidized beef tallow oil, epoxidized castor oil, epoxidized methyl stearate, epoxidized butyl stearate, epoxidized 2-ethylhexyl stearate, epoxidized stearyl stearate, 3,4-epoxycyclohexylmethyl-3,4-epoxycyclohexane carboxylate epoxidized soybean oil, epoxidized fatty acid methyl esters, epoxidized derivatives of each of the foregoing, and any combination of the foregoing. A nonlimiting example of naturally occurring epoxidized oil is Vernonia oil.

The second plasticizer may also include epoxidized polybutadiene, tris(epoxypropyl)isocyanurate, bisphenol A diglycidyl ether, vinylcyclohexene diepoxide, dicyclohexene diepoxide, and any combination thereof.

The epoxidized fatty acid ester can be prepared in a variety of ways. For example, natural oils can be used as the starting material. In this instance, the natural oils may be saponified to the fatty acids and then esterified with alcohols. Next, the low molecular weight esters are epoxidized. The unsaturated ester can be epoxidized with a per-acid.

Alternatively, a glycidyl ester of the fatty acid can be prepared via epichlorohydrin or related chemicals. In yet another alternate, it is possible to transesterify the triglyceride with alcohols and then epoxidize the unsaturated fatty ester with a per-acid.

In an embodiment, the epoxidized fatty acid ester can be any epoxidized fatty acid $C_1$-$C_{14}$ ester, including methyl, ethyl, propyl, butyl, and 2-ethylhexyl esters. In a further embodiment, the epoxidized fatty acid ester is an epoxide of a fatty acid methyl ester.

A nonlimiting example for the preparation of an epoxide of a fatty acid methyl ester begins with soy oil, wherein the soy oil is transesterified with methanol to make the methyl ester of the fatty acids in the oil. Glycerol is removed from the reaction products due to insolubility. A solution of per-acetic acid in ethyl acetate is used to epoxidize the double bonds on the fatty acids. The per-acid is kept below 35% per-acid and 35 degrees Celsius to prevent detonation. After completion, the ethyl acetate and product acetic acid are removed via vacuum stripping.

In an embodiment, the epoxidized fatty acid ester is epoxidized soybean oil.

The ACC/EFA mixture may be referred to as a "ACC/EFA plasticizer." The ACC/EFA plasticizer may include from about 1 wt % to about 99 wt % ACC and from about 99 wt % to about 1 wt % EFA, or from about 30 wt % to about 99 wt % ACC and from about 70 wt % to about 1 wt % EFA (based on the total weight of the plasticizer composition). In an embodiment, the ACC/EFA plasticizer contains less than 70 wt % ACC. Weight percent is based on total weight of the ACC/EFA plasticizer.

A "plasticizer composition" or "plasticizer" is a substance that lowers the modulus and tensile strength, and increases flexibility, elongation, impact strength, and tear strength of the polymeric resin (typically a thermoplastic polymer) to which it is added. A plasticizer may also lower the melting point of the polymeric resin, which lowers the glass transition temperature and enhances processability of the polymeric resin to which it is added.

In an embodiment, the plasticizer composition includes an ACW with a viscosity from about 100 mPa s to about 2000 mPa s at 25° C. The ACW may also have a hydroxyl number from 0 to less than 15, or 0 to less than 10, or 0 to less than 5, or 0 to less than 2, or 0. The ACW is blended with any of the foregoing EFAs.

In an embodiment, the plasticizer composition includes an ACO with a hydroxyl number from 0 to less than 15, or from 0 to less than 10, or from 0 to less than 5, or 0. The ACO may also have a viscosity from 50 mPa s to less than 1000 mPa s at 25° C. The ACO is blended with any of the foregoing EFAs.

The plasticizer composition may include one or more ACCs and/or one or more EFAs. In an embodiment, the plasticizer composition includes an acetylated castor component having a hydroxyl number from 0 to less than 15, or from 0 to less than 10, or from 0 to less than 5, or from 0 to less than 2, or 0, and epoxidized soybean oil (ESO). In a further embodiment, the ACC of the plasticizer composition has a hydroxyl number of 0 and the plasticizer composition also includes ESO.

In an embodiment, the plasticizer composition includes an ACC, a first EFA, and a second EFA. The second EFA is different than the first EFA. In a further embodiment, the plasticizer composition includes an ACC, ESO, and an epoxidized propylene glycol dioleate. In yet another embodiment, the plasticizer composition includes an ACC, ESO, and an epoxidized fatty acid methyl ester.

Although the plasticizer composition of this disclosure may be phthalate-free, in an embodiment, the plasticizer composition may also comprise other plasticizers including, but not limited to, phthalates (such as di-isononyl phthalate, diallyl phthalate, di-2-ethylhexyl-phthalate, dioctyl phthalate, diisodecyl phthalate and diisotridecyl phthlate), trimellitates (such as trioctyl trimellitate, triisononyl trimellitate and triisodecyl trimellitate), citrates, Grindsted® Soft-N-Safe acetylated monoglyceride of hydrogenated castor oil (product of Danisco), Hexamoll® DINCH diisononyl ester of 1,2-Cyclohexanedicarboxylic acid (product of BASF), benzoates and adipic polyesters.

The present plasticizer composition may comprise two or more embodiments disclosed herein.

The present composition composed of ACC alone or in combination with any EFA or other plasticizers may be used in a variety of compositions or products. Nonlimiting examples of suitable applications for the composition include cosmetic compositions/products, food compositions/products, and polymeric compositions/products, soft thermoplastic polyolefins, profiles (gaskets), films, etc.

The present disclosure provides a polymeric composition. In an embodiment, a polymeric composition is provided which includes a polymeric resin and the present plasticizer composition containing one, two, three, or more plasticizers. The plasticizer composition may be any ACC alone or in combination with any EFA or other plasticizer as disclosed herein. The polymeric composition contains from about 1 wt % to about 99 wt % of the polymeric resin and from about 99 wt % to about 1 wt % of the plasticizer composition. Weight percent is based on total weight of the polymeric composition.

Nonlimiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, EPDM rubber, propylene-based polymers, ethylene-based polymers, and vinyl chloride resins. The term, "propylene-based polymer," as used herein, is a polymer that comprises a majority weight percent polymerized propylene monomer (based on the total amount of polymerizable monomers), and optionally may comprise at least one polymerized comonomer. The term, "ethylene-based polymer," as used herein, is a polymer that comprises a majority weight percent polymerized ethylene monomer (based on the total weight of polymerizable monomers), and optionally may comprise at least one polymerized comonomer.

The term "vinyl chloride resin," as used herein, is a vinyl chloride polymer, such as polyvinyl chloride (PVC), or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The resin composition can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS resin).

In an embodiment, the vinyl chloride resin is polyvinyl chloride (PVC).

In an embodiment, the polymeric composition is a thermoplastic composition. A "thermoplastic composition," as used herein, is a polymeric composition (1) that has the ability to be stretched beyond its original length and retract to substantially its original length when released and (2) softens when exposed to heat and returns to substantially its original condition when cooled to room temperature.

In an embodiment, the polymeric composition includes the polymeric resin and a plasticizer including one or more ACC, optionally one or more EFA, and optionally a second EFA.

In an embodiment, the polymeric composition includes PVC, an ACC and optionally an EFA. The composition has a Shore hardness from about A60 to about A100, or from about A70 to about A95. In an embodiment, the polymeric composition has a Shore hardness from about D10 to about D70, or from about D20 to about D60.

In an embodiment, the plasticizer composition has a solution temperature from about 140° C. to about 200° C. as measured in accordance with DIN 53408. Applicants have surprisingly discovered that the plasticizer composition composed of ACC and an EFA unexpectedly provides a plasticizer with low viscosity and low volatility, which is particularly suitable for high temperature wire and cable applications, and which does not migrate out of a thermoplastic polymer in which it is incorporated. In addition, the solution temperature (of 140° C.-200° C.) for the present plasticizer composition is similar to the solution temperature of conventional high molecular weight plasticizers (typically between about 140° C. and about 180° C.). Moreover, the viscosity of the present plasticizer composition is less than the viscosity of conventional high molecular weight plasticizers, such as adipic polyester plasticizers. For example, adipic polyester plasticizers, known commercially as Ultramoll® IV and Ultramoll® III adipic polyesters (products of Lanxess) have very high viscosity (approximately 6000 to 6500 mPa s at 25° C.). It is known that the lower the viscosity of a plasticizer, the faster is its uptake into PVC powder. Hence, the present plasticizer compositions are absorbed into PVC at a faster rate than adipic polyester plasticizers, and even trimellitates of lower or similar viscosity. The present plasticizer composition exhibits an unexpected synergy between low viscosity and high molecular weight and yields a phthalate-free, safe, plasticized PVC with physical, chemical, and mechanical properties that meet and/or exceed the properties of PVC resins plasticized with conventional adipic polyester plasticizers or conventional phthalate-based plasticizers or conventional trimellitate-based plasticizers. Especially noteworthy is the retention of tensile properties exhibited by the present composition after oven aging for 168 hours at temperatures as high as 136° C.

The present polymeric composition exhibits the same, or better, flexibility and/or elongation when compared to polymer resins containing conventional adipic polyester, phthalate, and/or trimellitate plasticizers. In an embodiment, the present polymeric composition is a blend of PVC and an ACC/EFA plasticizer and has a Shore hardness from about A60 to about A100, or from about A70 to about A95, or from about D10 to about D70, or from about D20 to about D60. Shore hardness is measured in accordance with ASTM D2240.

In an embodiment, the polymeric composition is a blend of PVC and ACC/EFA plasticizer and has a glass transition temperature ("Tg") from about 10° C. to about 90° C., or from about 20° C. to about 80° C., or from about 30° C. to about 75° C.

In an embodiment, the polymeric composition is composed of a blend of PVC and the ACC/EFA plasticizer. The polymeric composition is molded into a plaque. The plaque has a tensile strength retention greater than about 70% after 168 hours heat aging at 113° C. as measured on dogbones cut from 30 mil thick plaques in accordance with ASTM D638.

In an embodiment, the polymeric composition is composed of a blend of PVC and the ACC/EFA plasticizer. The polymeric composition is molded into a plaque. The plaque has a tensile strength retention greater than about 70% after 168 hours heat aging at 136° C. as measured on dogbones cut from 30 mil thick plaques in accordance with ASTM D638.

In an embodiment, the present polymeric composition is composed of a blend of PVC and the ACC/EFA plasticizer composition. The polymeric composition is molded into a plaque. The plaque has a tensile elongation retention greater than about 30% after 168 hours heat aging at 113° C. as measured on 30 mil thick plaques in accordance with ASTM D638.

In an embodiment, the present polymeric composition is composed of a blend of PVC and the ACC/EFA plasticizer composition. The polymeric composition is molded into a plaque. The plaque has a tensile elongation retention greater than about 30% after 168 hours heat aging at 136° C. as measured on 30 mil thick plaques in accordance with ASTM D638.

The tensile strength and tensile elongation is measured for (i) unaged and (ii) heat aged dogbone specimens cut from compression molded plaques in accordance with ASTM D-638.

Any of the foregoing polymeric compositions may include one or more of the following additives: a filler, an antioxidant, a flame retardant (antimony trioxide, molybdic oxide and alumina hydrate), a heat stabilizer, an anti-drip agent, a colorant, a lubricant, a low molecular weight polyethylene, a hindered amine light stabilizer (having at least one secondary or tertiary amine group) ("HALS"), UV light absorbers (such as o-hydroxyphenyltriazines), curing agents, boosters and retardants, processing aids, coupling agents, antistatic agents, nucleating agents, slip agents, viscosity control agents, tackifiers, anti-blocking agents, surfactants, extender oils, acid scavengers, metal deactivators, and any combination thereof.

In an embodiment, the present polymeric composition includes a filler. Nonlimiting examples of suitable fillers include calcium carbonate, calcined clay, whiting, fuller's earth, magnesium silicate, barium sulfate, calcium sulfate, strontium sulfate, titanium dioxide, magnesium oxide, magnesium hydroxide, calcium hydroxide, hydrophilic fumed silica, hydrophobic (surface treated) fumed silica, and any combination of the foregoing. Nonlimiting examples of calcined clay are Satintone® SP-33 and Polyfil® 70.

In an embodiment, the present polymeric composition includes an antioxidant. Nonlimiting examples of suitable antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis (3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-timethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine antidegradants or stabilizers. Nonlimiting examples of suitable antioxidants include Topanol® CA, Vanox® 1320, Irganox® 1010, Irganox® 245 and Irganox® 1076. The antioxidant or antioxidants may be added to the plasticizer composition of this disclosure. Antioxidants can be used in amounts of 0.01 to 5 wt % based on the weight of the polymeric composition.

In an embodiment, the present polymeric composition includes a heat stabilizer. Nonlimiting examples of suitable heat stabilizers include lead-free mixed metal heat stabilizers, lead stabilizers, organic heat stabilizers, epoxides, salts of monocarboxylic acids, phenolic antioxidants, organic phosphites, hydrotalcites, zeolites, perchlorates and/or betadiketones. Nonlimiting examples of suitable betadiketones are dibenzoylmethane, palmitoyl benzoyl methane, stearoyl benzoyl methane and mixtures thereof. A nonlimiting example of suitable dibenzoylmethane is Rhodiastab® 83. A nonlimiting example of suitable mixtures of palmitoyl benzoyl methane and stearoyl benzoyl methane is Rhodiastab® 50. Nonlimiting examples of suitable lead-free mixed metal heat stabilizers include Mark® 6797, Mark® 6776 ACM, Mark® 6777ACM, Therm-Chek® RC215P, Therm-Chek® 7208, Naftosafe® EH-314, Baeropan® MC 90400 KA, Baeropan® MC 90400 KA/1, Baeropan® MC8553 KA-ST 3-US, Baeropan® MC 9238 KA-US, Baeropan® MC 90249 KA, and Baeropan® MC 9754 KA. The heat stabilizer or heat stabilizers may be added to the plasticizer composition of this disclosure. Heat stabilizers can be used in amounts of 0.1 to 10 wt % based on the total weight of the polymeric composition.

In an embodiment, the present polymeric composition includes a lubricant. Nonlimiting examples of suitable lubricants include stearic acid, metal salts of stearic acid, paraffin wax, and polyethylene glycols. The lubricants may be used alone or in combination. The lubricant may also be combined with the heat stabilizer.

In an embodiment, the present polymeric composition includes a processing aid. Nonlimiting examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the total weight of the polymeric composition.

The polymeric compositions are generally prepared according to conventional dry blend or wet blend methods known to those skilled in the art of PVC compounding. The mixtures obtained from the blending process can be further compounded with a mixer such as a Banbury batch mixer, a Farrel Continuous Mixer, or a single or twin screw extruder.

In an embodiment, the present polymeric composition is made by absorption of the plasticizers of this disclosure in PVC powder to make a dry blend. Any suitable method/ apparatus may be used to make the dry blend including, but not limited to, a Henschel mixer or a ribbon blender. The polymeric composition may contain other additives in addition to the PVC and the plasticizer. The dry blend may then be further compounded (via melt extrusion for example) and formed into any desired shape (film, pellet, etc.).

With an optimal stabilizer and antioxidant package, the present polymeric compositions are suitable for applications requiring long term dry or wet insulation resistance testing at elevated temperatures, and other demanding applications where temperatures are as high as 136° C.

The present polymeric composition(s) may comprise two or more embodiments disclosed herein.

The surprising properties of flexibility, low plasticizer volatility, low migration, low viscosity and/or high solution temperature exhibited by the present polymeric composition make it well suited for wire and cable coating applications, and high temperature wire/cable applications in particular. Accordingly, the present disclosure provides a coated conductor. A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

In an embodiment, a coated conductor is provided and includes a conductor and a coating on the conductor. The coating is composed of the present polymeric composition which includes the polymeric resin and the present plasticizer composition. The polymeric resin of the coating may be any polymeric resin disclosed herein. The plasticizer composition may be any plasticizer composition composed of one or more ACC alone or blended with one or more EFA, and/or blend with one or more other plasticizers as disclosed herein.

A "metal conductor," as used herein, is at least one metal wire and/or at least one metal cable. The coated metal conductor may be flexible, semi-rigid, or rigid. The coating (also referred to as a "jacket" or a "sheath" or "insulation") is on the metal conductor or on another polymeric layer around the conductor. The coating includes the present composition. The composition may be any composition as disclosed herein. As used herein, "on" includes direct contact or indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening structure(s) and/or intervening material(s) is/are located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In an embodiment, the polymeric resin is a vinyl chloride resin such as PVC as discussed above. The PVC is blended with the plasticizer composition to form the coating. The coating may include additional components. In an embodiment, the coating includes from about 1 wt % to about 99 wt % or from about 20 wt % to about 80 wt %, or from about 30 wt % to about 70 wt % PVC and from 99 wt % to about 1 wt %, or from about 80 wt % to about 20 wt %, or from about 70 wt % to about 30 wt % plasticizer composition. In a further embodiment, the coating contains from about 30 wt % to about 90 wt % PVC and from about 70 wt % to about 10 wt % of the plasticizer composition.

The plasticizer composition may be any plasticizer composition disclosed herein. In an embodiment, the ACC present in the coating has a hydroxyl number from 0 to less than 15, or from 0 to less than 10, or from 0 to less than 5, or from 0 to less than 5, or 0.

The coating may have any of the properties as discussed above for the present composition. In an embodiment, the coated conductor passes the heat test as measured in accordance with UL-1581. In another embodiment, the plasticizer composition in the coating has a solution temperature from about 140° C. to about 200° C. In another embodiment, the coating has a Shore hardness from about A60 to about A100 as measured in accordance with ASTM D2240. In another embodiment, the coating has a Shore hardness from about D10 to about D70 as measured in accordance with ASTM D 2240.

Nonlimiting examples of suitable coated metal conductors include flexible wiring such as flexible wiring for consumer electronics, a power cable, a power charger wire for cell phones and/or computers, computer data cords, power cords, appliance wiring material, building wire, automotive wire, and consumer electronic accessory cords.

The present coated conductor may comprise two or more embodiments disclosed herein.

The coated conductor, such as a coated wire or a coated cable (with an optional insulation layer), with a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

The wire and cable constructions (i.e., a coated metal conductor) of this disclosure are made by extruding the present composition onto the conductor or onto the bundle of insulated conductors to form a coating (or a jacket) around the insulated conductors. The thickness of the jacket or insulation depends on the requirements of the desired end use application. Typical thickness of the jacket or insulation is from about 0.010 inches to about 0.200 inches, or from about 0.015 inches to about 0.050 inches. The present composition may be extruded into the jacket from previously made composition. Usually the present composition is in the form of pellets for easy feeding into the extruder. The wire and cable jacket or insulation may be extruded directly from the compounding extruder without going through the separate step of pelletizing the present composition. This one-step compounding/extrusion process would eliminate one heat history step for the composition.

A nylon layer may also be extruded over the insulation, such as in conventional THHN, THWN and THWN-2 constructions.

Nonlimiting examples of embodiments of the present disclosure are provided below.

In an embodiment E1, an acetylated castor oil is provided having a hydroxyl number from 0 to less than 5 as measured in accordance with DIN 53402. In an embodiment E2, an acetylated castor wax is provided having a viscosity less than 2000 m Pa s as measured in accordance with ASTM D445 at 25° C.

In an embodiment E3, a composition comprises: an acetylated castor component, and an epoxidized fatty acid ester. E4. The composition of E3 wherein the acetylated castor component is selected from the group consisting of acetylated castor oil, acetylated castor wax, and combinations thereof. E5. The composition of any of E3-E4 wherein the acetylated castor component has a hydroxyl number from 0 to less than 15. E6. The composition of any of E3-E5 wherein the acetylated castor component is an acetylated castor wax having a viscosity less than 2000 mPa s at 25° C. as determined in accordance with ASTM D445. E7. The composition of any of E3-E6 wherein the epoxidized fatty acid ester is selected from the group consisting of epoxidized soybean oil, epoxidized propylene glycol dioleate, epoxidized palm oil, epoxidized linseed oil, epoxidized fatty acid methyl esters, epoxidized derivatives of each of the foregoing, and combinations thereof. E8. The composition of any of E3-E7 comprising from about 30 wt % to about 99 wt % acetylated castor component and from about 1 wt % to about 70 wt % epoxidized fatty acid ester. E9. The composition of any of claims E3-E8 comprising an acetylated castor component having a hydroxyl number from 0 to less than 5; and epoxidized soybean oil. E10. The composition of any of claims E3-E9 comprising a second epoxidized fatty acid ester.

In an embodiment E11, a polymeric composition comprises a polymeric resin; and a plasticizer composition comprising an acetylated castor component and optionally an epoxidized fatty acid ester. E12. The composition of E11 comprising a composition of any of E1-E10. E13. The composition of any of E11-E12 wherein the polymeric resin comprises a vinyl chloride resin. E14. The composition of any of E11-E13 wherein the plasticizer composition comprises a first epoxidized fatty acid ester and a second epoxidized fatty acid ester. E15. The composition of any of E11-E14 wherein the composition is a plaque having a tensile elongation retention after 168 hours heat aging 113° C. of greater than 50%. E16. The composition of any of claims 11-15 wherein the composition is a plaque having a tensile elongation after 168 hours heat aging 136° C. of greater than 50%. E17. The composition of any of E11-E16 having a volume resistivity from about 1.0 E+10 to about 1.0 E+17 Ohm cm.

In an embodiment E18, a coated conductor comprises: a conductor; and coating on the conductor, the coating comprising a polymeric resin and a plasticizer composition comprising an acetylated castor component and optionally an epoxidized fatty acid ester. E19. The coated conductor of E18 wherein the coating comprises a composition of any of E1-E17. E20. The coated conductor of any of E18-E19 wherein coating passes the heat test as determined in accordance with UL-1581.

Test Methods

Acid number (or "acid value") is a measure of the amount of free acid present in a compound. The acid number is the number of milligrams of potassium hydroxide required for the neutralization of free acid (fatty acid and/or other acid such as acetic acid, for example) present in one gram of a substance. The acid number is determined in accordance with German Standard DIN 53402 (mg KOH/g).

APHA color is measured using Color Quest XE colorimeter, available from HunterLab, or equivalent; 20-mm transmission cell; HunterLab Universal software, version 4.10 or equivalent; Black and White color reference titles available from HunterLab, or equivalent; the measured APHA color value of deionized (DI) water is zero.

Density at 25° C. is determined in accordance with German Standard DIN 51 757 (g/cm$^3$).

Dynamic storage modulus (G') and Glass transition temperature (Tg) are determined by dynamic mechanical analysis (DMA) using a TA Instrument AR1000N Rheometer having DMA fixtures. The specimen is in the form of a rectangular solid and tested in tension mode. The temperature is varied from –100° C. to +160° C. at a ramp rate of 5° C./min, and the test frequency is held constant at 6.283 rad/s (1 Hz). The storage and loss modulus of the sample, as well as the tan delta, are measured as a function of the temperature. The glass transition temperature (Tg) is determined from the peak tan delta measurement. Dynamic storage modulus (G') at –20° C. is used as a measure of low temperature flexibility. The storage and loss modulus of viscoelastic materials are measures of the stored energy (representing the elastic portion) and the energy dissipated as heat (representing the viscous portion).

Hydroxyl Number (or hydroxyl value) is an indication of the degree of acetylation and is a measure of the number of hydroxyl groups present in a polymer. The hydroxyl number is the number of milligrams of potassium hydroxide required to neutralize the hydroxyl groups in one gram of polymer. The hydroxyl number is determined in accordance with German Standard DIN 53 240 (mg KOH/g).

Iodine Number is an indication of the degree of hydrogenation and is determined in accordance with German Einheitsmethode DGF C-V 11a (53) (g $I_2$/100 g).

Plasticizer compatibility in the polymeric composition is assessed by visual inspection of molded or extruded specimens aged at elevated temperatures (e.g., 113° C. or 136° C.) for defined lengths of time (e.g., 7 days). The extruded specimens may be in the form of a wire (i.e., insulation extruded over conductor). The amount of exudate (spew) on surface after 7 days at 113° C. or 136° C. is rated as "none", "slight", "moderate", or "heavy".

Shore hardness is determined in accordance with ASTM D 2240.

Solution Temperature is the temperature at which a heterogeneous mixture of plasticizer and a PVC resin is observed to change to a single phase. Solution temperature is determined by immersing 1 gram PVC in 20 grams of plasticizer and increasing the temperature stepwise until the PVC is seen to be completely dissolved by observation under a microscope, in accordance with German Standard DIN 53 408 (° C.).

Surface smoothness of coated conductors (extruded wires) is measured using a surface roughness measuring apparatus made by Mitutoyo of Japan, in accordance with ANSI/ASME B46.1.

Temperature of 5% mass loss (° C.) is determined using TG/DTA 220. The plasticizer specimen is heated from room temperature up to 600° C. at 10K/min under inert gas purge, and the appearing mass loss and thermal effects are recorded in thermograms. The higher the temperature for 5% mass loss, the lower the volatility.

Tensile strength (TS), tensile strength retention (TSR), tensile elongation (TE), and tensile elongation retention (TER) (at 2 inch/min) on unaged specimens, on specimens aged at 113° C. or at 136° C. for 168 hours, is determined in accordance with ASTM D638 and UL 1581/2556 either on dogbones cut from molded plaques or tubular insulations removed from coated conductors (extruded wires).

The term "UL 1581" is Underwriters Laboratories Reference Standard for Electrical Wires, Cables, and Flexible Cords. UL 1581 contains specific details for conductors, insulation, jackets and other coverings, and for methods of sample preparation, specimen selection and conditioning, and for measurement and calculation that are required in wire and cable standards.

Viscosity is determined in accordance with Standard ASTM D445, Brookfield-Viscosimeter at 25° C. and/or 40° C.

Volume resistivity (Ohm-cm) at 23° C. (Vol. Res.), with 500 volts direct current, is measured in accordance with ASTM D257. Specimens of 3.5 inch diameter are cut from 40 mil thick molded plaques and tested using a Hewlett Packard 16008A Resistivity Cell connected to a Hewlett Packard 4329A High Resistance Meter.

Water content is determined in accordance with German Standard DIN 51 777(%).

Weight Retained (%) after 7 Days at 136° C. (Wt. Ret.) is measured on specimens of 1.25 inch diameter that are cut from 30 mil thick molded plaques.

The wet insulation resistance is measured on wire samples with 14 AWG solid copper conductor and 0.015 in. insulation thickness according to UL 83/2556. The sample lengths are 14 feet, with 10 feet in a coil immersed in water and 2 feet on both ends acting as leads to the power source. The samples are aged in a water bath at 75° C. and under 600 V AC for a period of up to 36 weeks. The insulation resistance is measured with 500 V DC applied for 60 seconds with a Quadtech 1868A megohmmeter. The first measurement is conducted after 6 hours of water immersion, with no voltage applied. All subsequent measurements are taken at a weekly frequency.

By way of example, and not by limitation, examples of the present disclosure are provided.

EXAMPLES

A. Acetylated Castor Component

Example 1

Acetylated Castor Wax Sample (ACW1)—Preparation

Castor wax (110 g) and acetic anhydride (40 g) are charged in a 250 mL-flask. The flask is fixed to a vacuum rotation evaporator and heated to 100° C. until the wax is molten. The reaction is carried out at 120° C. over 4 hours at normal pressure. Vacuum of 800 to 100 mbar is used to remove acetic acid at a bath temperature of 115° C. A liquid product is obtained.

Example 2

Acetylated Castor Wax (ACW2)—Preparation

Castor wax (1 kg) is charged in a 2 L-flask. The flask is fixed with mechanical stirrer and common distillation glassware in a preheated bath of 100° C. Acetic anhydride (370 g) is added after melting of the wax. The temperature rises due to an exothermic reaction and is maintained at 115° C. over 4 hours. Vacuum from 800 to 180 mbar is used to remove acetic acid at a bath temperature of 115° C. A liquid product is obtained.

Example 3

Acetylated Castor Oil Sample (ACO)—Preparation

Castor oil (110 g) and acetic anhydride (40 g) are charged in a 250 mL-flask. The flask is fixed to a vacuum rotation evaporator, heated to 120° C. and the temperature is maintained at 120° C. for 3 hours. Vacuum of 800 to 150 mbar is used to remove acetic acid at a bath temperature of 120° C. A liquid product is obtained.

Example 4

Acetylated Castor Wax (ACW3)—Preparation

Castor wax (3700 g) is charged in a 5 L-reactor. The reactor is fixed with mechanical stirrer and common distillation glassware and is heated by an external bath to a temperature of 100° C. After melting the castor wax, acetic anhydride (1233 g) is added. Temperature falls to 84° C. and rises to 115° C. by the exothermic reaction. Temperature is maintained at 115° C. (inside) over 8 hours. Vacuum from 800 to 150 mbar is used to remove acetic acid until the Acid Number is lower than 3 mg KOH/g. A liquid product is obtained.

Example 4A

Acetylated Castor Wax (ACW3a)—Preparation

Castor wax (3700 g) is melted over night at 105° C. and charged in a 5 L-reactor. The reactor is fixed with mechanical stirrer and common distillation glassware and is heated by an external bath to a temperature of 105° C. Acetic anhydride (1233 g) is added. Temperature falls to 88° C. and rises to 115° C. by the exothermic reaction. Temperature is maintained at 120° C. (inside) over 8 hours and at room temperature overnight. Vacuum from 800 to 150 mbar is used to remove residual acetic acid at a bath temperature of 115° C. until the Acid Number is 1.6 mg KOH/g. A liquid product is obtained.

Example 5

Acetylated Castor Oil Sample (ACO)—Preparation

Castor oil (773 g) and acetic anhydride (266 g) are charged a 2 L-flask. The flask is fixed with mechanical stirrer and common distillation glassware in a preheated bath of 115° C. The temperature is maintained at 115° C. over 6 hours.

Vacuum from 800 to 150 mbar is used to remove acetic acid at a bath temperature of 115° C. A liquid product is obtained.

Table 2 below sets forth the properties of Examples 1-5, in comparison with comparative samples (commercially available acetylated derivatives of castor oil and castor wax). The plasticizers of Examples 1, 2 and 4 (ACW) are substantially less viscous than comparative sample 3. The plasticizers of Example 3 and 5 (ACO) have a lower hydroxyl number than comparative sample 1. All plasticizers of Examples 1 to 5 exhibit lower volatility (i.e., higher temperature of 5% mass loss), lower specific gravity, and a higher solution temperature than comparative sample 2.

TABLE 2

| Property | Ex 1 ACW1 | Ex 2 ACW2 | Ex. 3 ACO | Ex 4 ACW3 | Ex 4A ACW3A | Ex. 5 ACO | CS 1 FP-8 | CS 2 S-N-S | CS 3 Pari 8 |
|---|---|---|---|---|---|---|---|---|---|
| App. | Yellow Liq. | Yellow Liq. | Yellow Liq. | Yellow Liq. | Yellow Liq. | Yellow Liq. | Yellow Liq. | Clear Liq. | Paste |
| IV | 3 | 3 | 75 | 4 | 4 | 75 | 76 | 4 max. | 2 |
| AN | 1.5 | 1.0 | 3.6 | 2.4 | 1.6 | 1.9 | 1.2 | 1.5 | 1.8 |
| OHN | 0 | 0 | 0 | 0 | 0 | 0 | 5 | 0 | 9.4 |
| Sol. Temp | 197 | 190 | 190 | 194 | 194.5 | 189 | 190.5 | 151 | >200 |
| 5% Temp | 335 | 322 | 330 | | | | 324 | 266 | 328 |
| Water | 0.19 | 0.02 | 0.05 | 0.03 | 0.01 | 0.01 | 0.07 | 0.03 | 0.1 |
| Visc. | | | | | | | | | |
| 25° C. | 340 | 340 | — | 345 | 345 | 240 | 230 | 100 | 5390 |
| 40° C. | 145 | 145 | — | 150 | 150 | 115 | 115 | 45 | 1310 |
| Dens. | 0.953 | 0.952 | 0.974 | 0.953 | 0.952 | 0.966 | 0.964 | 0.999 | 0.955 |

5% Temp. = Temp. of 5% mass loss (° C.), TG/TGA
AN = acid number (mg KOH/g) DIN 53402
App. = Appearance @ RT
CS = Comparative sample
Dens. = Density (@ 25 C.) DIN 51757
FP-8 = Flexricin ® P-8 (acetylated castor oil) (available from Vertellus)
IV = Iodine value (g $I_2$/100 g) Deutsche Einheitsmethode DGF C-V 11a (53) or from technical data sheet
OHN = hydroxyl number (mg KOH/g) DIN 53240
Pari 8 = Paricin ® 8 (acetylated castor wax) (available from Vertellus)
S-N-S = Grindsted ® Soft-N-Safe (acetylated monoglyceride of hydrogenated castor oil (available from Danisco)
Sol. Temp = Solution Temperature (° C.) DIN 53408
Visc. = Viscosity (mPas) ASTM D445 Brookfield 25° C., 40° C.
Water = wt % water, DIN 51777

Table 3 sets forth other plasticizers and the abbreviation and source for each.

TABLE 3

| Abbreviation | Name | Trade Name and Source |
|---|---|---|
| EPGD | Epoxidized propylene glycol dioleate | Vikoflex ® 5075, Arkema |
| ESO | Epoxidized soybean oil | PLAS-CHEK ® 775, Ferro |
| DIDP | diisodecyl phthalate | TCI Japan |
| DOP | dioctyl phthalate | TCI America |
| DTDP | Diisotridecyl phthalate | Scientific Polymer Products |
| TINTM | triisononyl trimellitate | Sigma-Aldrich, America |
| TOTM | trioctyl trimellitate | Sigma-Aldrich, America |
| DINCH | 1,2-Cyclohexanedicarboxylic acid, diisononyl ester | HEXAMOLL ® DINCH, BASF |

B. Thermoplastic Compositions: Blends of PVC & Plasticizer Composition

Thermoplastic compositions composed of blends of polyvinylchloride (PVC) with various plasticizer compositions and additives are prepared as shown in Table 4 below.

TABLE 4

Thermoplastic Compositions

| | Blend 1 | Blend 2 | Blend 3 | Blend 4 | Blend 5 | Blend 6 | Blend 7 | Blend 8 | Blend 9 | Blend 10 | Blend 10A |
|---|---|---|---|---|---|---|---|---|---|---|---|
| PVC | 63.9 | 63.9 | 63.9 | 63.9 | 63.9 | 63.9 | 63.9 | 63.9 | 62.3 | 63.9 | 63.0 |
| Plasticizer | 23.8 (87)* | 23.8 (87)* | 23.8 (87)* | 23.8 (87)* | n/a (ESO is sole plasticizer) | 27.3 (100)* | 27.3 (100)* | 27.3 (100)* | 30.0 (100)* | 27.3 (100)* | 27.3 (100)* |
| CaCO3 | 6.4 | n/a | 3.2 | n/a | n/a | n/a | n/a | n/a | n/a | n/a | n/a |

TABLE 4-continued

Thermoplastic Compositions

|  | Blend 1 | Blend 2 | Blend 3 | Blend 4 | Blend 5 | Blend 6 | Blend 7 | Blend 8 | Blend 9 | Blend 10 | Blend 10A |
|---|---|---|---|---|---|---|---|---|---|---|---|
| Polyfil ® 70 | n/a | 6.4 | 3.2 | 6.4 | 6.4 | 6.4 | 6.4 | 6.4 | n/a | n/a | n/a |
| Satintone ® SP-33 | n/a | n/a | n/a | n/a | n/a | n/a | n/a | n/a | 6.4 | 6.4 | 6.4 |
| ESO | 3.5 (13)* | 3.5 (13)* | 3.5 (13)* | 3.5 (13)* | 27.3 (100)* | (present as plasticizer) | (present in some formulations as plasticizer) | (present in some formulations as plasticizer) | (present as plasticizer) | (present in some formulations as plasticizer) | (present as plasticizer) |
| Mark 6797 | 2.1 | 2.1 | 2.1 | 2.1 | 2.1 | 2.1 | n/a | n/a | n/a | n/a | n/a |
| Baeropan ® MC 9754 KA | — | — | — | — | — | — | 2.1 | — | — | — | — |
| Mark ® 6776 ACM | | | | | | | | 2.1 | — | — | — |
| Baeropan ® MC 90249 KA | | | | | | | | | 1.0 | — | 3.0 |
| Naftosafe ® EH-314 | | | | | | | | | | 2.1 | — |
| Irganox ® 1076 | 0.3 | 0.3 | 0.3 | 0.3 | 0.3 | 0.3 | 0.3 | 0.3 | 0.3 | 0.3 | 0.3 |

Baeropan ® MC 90249 KA = calcium-zinc heat stabilizer (Baerlocher)
Baeropan ® MC 9754 KA = calcium-zinc heat stabilizer (Baerlocher)
CaCO₃ = Hubercarb ® Q1T calcium carbonate
Irganox ® 1076 = hindered phenolic antioxidant (Ciba Chemicals)
Mark ® 6797 = calcium-zinc stabilizer (Chemtura Corp.)
Mark ® 6776 ACM = barium-zinc stabilizer (Chemtura Corp.)
Naftosafe ® EH-314 = calcium-zinc heat stabilizer (Chemson)
Polyfil ® 70 = kaolin clay
PVC = polyvinyl chloride homopolymer (OxyVinyls ® 240F)
Satintone ® SP-33 = calcined clay
Values = wt % based on total weight of composition
*Wt % based on weight of total plasticizer Thermoplastic Compositions 1, 2 and 5 (Blends 1, 2, and 5)

The following procedure is used to prepare the Blends 1, 2 and 5:

Weigh the individual ingredients and mix all in a container using a spatula

Use "40 cm³" Brabender mixing bowl with conventional rotors to make batches of each formulation at 40 rpm setting Do not purge mixing bowl with nitrogen Add mixture of PVC and other ingredients, and mix at 175° C. for 5 minutes The blend compositions from the mixing bowl are compression molded into 30 mil thick plaques at 175° C. for 5 minutes for testing of all properties except volume resistivity. Volume resistivity is measured on specimens cut from 40 mil thick molded plaques.

Thermoplastic Compositions 3 and 6 (Blends 3 and 6)

The following procedure is used to prepare Blends 3 and 6:

Preheat plasticizers (and epoxidized soybean oil if applicable) to 60° C. for at least 30 minutes and shake before use Weigh the individual solid ingredients and mix all in a container using a spatula Make 'dry blends' by soaking plasticizer into PVC powder, as follows Use "40 cm³" Brabender mixing bowl with sigma blades at 80° C. to make batches of each formulation at 40 rpm setting Do not purge mixing bowl with nitrogen After 2 min warm-up, add mixture of PVC powder, filler, Mark® 6797 and Irganox® 1076 and mix for 5 minutes Add plasticizer and mix for 15 minutes Stop and remove "dry blend"

The 'dry blends' are subsequently melt mixed using the following procedure:

(a) Mix in a "40 cm³" Brabender mixing bowl with conventional rotors at 40 rpm setting (b) Do not purge mixing bowl with nitrogen (c) Add 'dry blend', and mix at 175° C. for 5 minutes The blend compositions are removed from the mixing bowl and are compression molded at 175° C. for 5 minutes. Specimens are cut from 30 mil thick molded plaques for testing of all properties except volume resistivity. Volume resistivity is measured on specimens cut from 40 mil thick molded plaques.

Thermoplastic Compositions 4, 7 and 8 (Blends 4, 7 and 8)

The following procedure is used to prepare Blends 4, 7 and 8:

Preheat plasticizer (and epoxidized soybean oil if applicable) to 60° C. for minimum 30 minutes, mix and shake before use Weigh the individual solid ingredients and mix all in a container using a spatula Use a Henschel mixer to mix 1 kg of 'dry blend' at a set temperature of 80° C. and 1800 rpm, by first fluxing the solids mixture and then adding the plasticizer, recording time for plasticizer sorption to be completed.

The 'dry blend' is melt mixed using a conical twin screw extruder (25:1 L/D) at 45 rpm and set temperature profile of zone 1=160° C., zone 2=165° C., zone 3=170° C., die=175° C.

The extruded strands are subsequently air cooled and pelletized.

The pellets are compression molded at 175° C. for 5 minutes. Specimens are cut from 30 mil molded plaques for testing of all properties except volume resistivity. Volume resistivity is measured on specimens cut from 40 mil thick molded plaques. The pellets from Blend 4 and Blend 8 are also used to fabricate wire/cable by coating onto a 0.064 inch (14 AWG) solid copper conductor using 25:1 single-screw extruder at set temperatures of 160° C., 165° C.; 170° C.; 175° C. The outside diameter of the coated conductor is approximately 0.094 inch (approximately 0.015 inch thick wall). Die pressures during wire extrusion are noted.

Thermoplastic Composition 9 (Blend 9)

The following procedure is used to prepare Blend 9:

Preheat Paricin® 8 and epoxidized soybean oil to 60° C. for at least 60 minutes, shake and make a 25/75 wt % Paricin® 8/ESO mixture (plasticizer composition)

Make "solids mixture" by mixing all ingredients (except plasticizer and clay filler) in a container using a spatula Make 'dry blends' by soaking plasticizer into PVC powder, as follows Use "40 cm$^3$" Brabender mixing bowl with sigma blades at 90° C. to make batches of each formulation at 40 rpm setting Do not purge mixing bowl with nitrogen After 2 min warm-up, add "solids mixture" and mix for 30 seconds Add plasticizer and mix for 6 minutes Add filler (clay) and mix for 60 seconds Stop and remove "dry blend"

The 'dry blend' is subsequently melt mixed using the following procedure:
  (a) Mix in a "40 cm$^3$" Brabender mixing bowl with cam rotors at 40 rpm setting
  (b) Do not purge mixing bowl with nitrogen
  (c) Add 'dry blend', and mix at 180° C. for 2 minutes The blend composition is removed from the mixing bowl and is compression molded at 180° C. for 5 minutes. Specimens are cut from 30 mil thick molded plaques for testing of all properties except volume resistivity and Shore hardness. Volume resistivity is measured on specimens cut from 40 mil thick molded plaques. Shore hardness is measured on molded specimens of 250 mil thickness.

Thermoplastic Composition 10 (Blend 10)

The following procedure is used to prepare Blend 10:

Preheat ACW, ESO, S—N—S, TOTM and DINCH to 60° C. for at least 60 minutes. Shake and make the 50/50 wt % ACW/ESO, ACW/S—N—S, ACW/TOTM, ACW/DINCH mixtures (plasticizer compositions)

Make "solids mixture" by mixing all ingredients (except plasticizer and clay filler) in a container using a spatula Make 'dry blends' by soaking plasticizer into PVC powder, as follows Use "40 cm$^3$" Brabender mixing bowl with sigma blades at 80° C. to make batches of each formulation at 40 rpm setting Do not purge mixing bowl with nitrogen After 2 min warm-up, add "solids mixture" and mix for 30 seconds Add plasticizer and mix for 2 minutes Add filler (clay) and mix for 60 seconds Stop and remove "dry blend"

The 'dry blend' is subsequently melt mixed using the following procedure:
  (a) Mix in a "40 cm$^3$" Brabender mixing bowl with cam rotors at 40 rpm setting
  (b) Do not purge mixing bowl with nitrogen
  (c) Add 'dry blend', and mix at 175° C. for 2 minutes The blend composition is removed from the mixing bowl and is compression molded at 175° C. for 5 minutes. Specimens are cut from 30 mil thick molded plaques for testing of all properties except volume resistivity. Volume resistivity is measured on specimens cut from 40 mil thick molded plaques.

Thermoplastic Composition 10A (Blend 10A)

The following procedure is used to prepare Blend 10A:

Preheat the plasticizer to 60° C. for at least 60 minutes and shake before use

Weigh out the individual ingredients

First make 'dry blend' by soaking plasticizer into PVC powder, and then make melt mixture The following procedure is used for preparations of the 'dry blend':
  (a) Make "solids mixture" by mixing everything (except plasticizer and filler) in a container using spatula.
  (b) Use a Henschel type high-intensity mixer to prepare 3 kg of 'dry blend' at a set temperature of 90° C. and 1800 rpm, by first fluxing the solids mixture for 60 seconds, then adding and mixing the plasticizer over a period of 360 seconds (6 minutes), and finally adding the clay and mixing for additional 90 seconds.
  (c) Stop and remove "dry blend".

The 'dry blend' is subsequently melt mixed using a conical twin screw extruder (25:1 L/D) at 45 rpm and set temperature profile of zone 1=170° C., zone 2=175° C., zone 3=180° C., die=185° C. The extruded strands are subsequently air cooled and pelletized.

The pellets are compression molded at 180° C. for 5 minutes. Specimens are cut from 30 mil molded plaques for testing of all properties except volume resistivity and Shore hardness. Volume resistivity is measured on specimens cut from 40 mil thick molded plaques. Shore hardness is measured on molded specimens of 250 mil thickness. The pellets are also used to fabricate wire/cable by coating onto a 0.064 inch (14 AWG) solid copper conductor using 25:1 single-screw extruder at 40 rpm and set temperatures of 170° C., 175° C.; 180° C.; 185° C. The outside diameter of the coated conductor is approximately 0.094 inch (i.e., approximately 0.015 inch thick insulation). Die pressures during wire extrusion are noted. Wet insulation resistance at 75° C. of the wire is measured.

Table 5 provides properties for the various thermoplastic compositions.

TABLE 5

| Blend # | Plasticizer† | Shore (A) | Shore (D) | Tg | G' −20° C. | TS (Unaged) | TSR 113° C. | TSR 136° C. | TE (Unaged) | TER 113° C. | TER 136° C. | Wt Ret. | Spew 113° C. | Spew 136° C. | Vol Res | 5% Temp |
|---|---|---|---|---|---|---|---|---|---|---|---|---|---|---|---|---|
| 1 | Ex 1 (87) ESO (13) | 95.9 ± 0.2 | | 55.2 | 7.70E+08 | 2844 ± 65 | 90 ± 3 | 93 ± 3 | 268 ± 0 | 86 ± 1 | 76 ± 4 | n/a | | | 4.13E+11 | n/a |
| 1 | DIDP (87) ESO (13) | 91.1 ± 0.3 | | 28.1 | 9.51E+08 | 2947 ± 288 | 114 ± 30 | 171 ± 16 | 243 ± 32 | 97 ± 43 | 18 ± 16 | n/a | | | 7.54E+12 | n/a |
| 1 | TNTM (87) ESO (13) | 91.3 ± 0.4 | | 30.6 | 1.10E+09 | 2732 ± 319 | 110 ± 3 | 107 ± 13 | 229 ± 38 | 111 ± 7 | 91 ± 17 | n/a | | | 7.04E+12 | n/a |
| 2 | Ex 1 (87) ESO (13) | 93.8 ± 0.9 | | 58.8 | 7.82E+08 | 2083 ± 73 | 105 ± 2 | 103 ± 3 | 87 ± 8 | 66 ± 5 | 93 ± 11 | 97.3 | | | 5.56E+11 | n/a |
| 2 | TOTM (87) ESO (13) | 87.5 ± 1.3 | | 41.4 | n/a | 2441 ± 34 | 96 ± 8 | 116 ± 5 | 115 ± 4 | 88 ± 11 | 75 ± 7 | 96.7 | | | 3.24E+13 | n/a |
| 2 | Pari 8 (87) ESO (13) | 90.8 ± 1.0 | | 60.5 | 9.14E+08 | 1832 ± 30 | 108 ± 5 | 110 ± 2 | 55 ± 2 | 36 ± 5 | 78 ± 12 | 96.1 | | | 6.53E+11 | n/a |
| 2 | S-N-S (87) ESO (13) | 89.3 ± 0.2 | | 25.7 | 9.71E+08 | 2340 ± 3 | 112 ± 3 | 177 ± 32 | 141 ± 13 | 89 ± 11 | 4 ± 3 | 91.5 | | | 4.63E+11 | n/a |
| 3 | Ex 1 (87) ESO (13) | 96.3 ± 0.5 | | 60.1 | 8.42E+08 | 3277 ± 162 | 105 ± 5 | 102 ± 3 | 234 ± 9 | 95 ± 3 | 77 ± 10 | 98.1 | | | 1.35E+12 | n/a |
| 3 | Ex 2 (87) ESO (13) | 95.0 ± 0.8 | | 63.0 | 8.38E+08 | 3183 ± 149 | 96 ± 6 | 100 ± 4 | 225 ± 14 | 98 ± 8 | 79 ± 16 | 98.4 | | | 1.52E+12 | n/a |
| 3 | TOTM (87) ESO (13) | 93.3 ± 0.3 | | 39.8 | 1.39E+09 | 3925 ± 158 | 83 ± 24 | 108 ± 4 | 282 ± 5 | 73 ± 37 | 86 ± 1 | 97.3 | | | 6.87E+13 | n/a |
| 4 | Ex 2 (87) ESO (13) | 97.3 ± 0.5 | | 59.6 | 9.20E+08 | 3709 ± 86 | 89 ± 10 | 80 ± 11 | 234 ± 31 | 76 ± 33 | 79 ± 27 | 98.7 | | | 8.75E+11 | 280 |
| 4 | TOTM (87) ESO (13) | 97.4 ± 0.2 | | 41.0 | 1.48E+09 | 4136 ± 69 | 90 ± 2 | 86 ± 2 | 232 ± 98 | 113 ± 69 | 96 ± 48 | 97.5 | | | 6.47E+13 | 265 |
| 1 | Ex 3 (87) ESO (13) | 96.5 ± 0.3 | | 55.4 | 8.47E+08 | 2332 ± 37 | 103 ± 3 | 101 ± 1 | 134 ± 5 | 99 ± 1 | 66 ± 4 | n/a | | | 1.17E+12 | |
| 1 | DIDP (87) ESO (13) | 93.1 ± 0.3 | | 39.4 | 1.03E+09 | 2308 ± 10 | 118 ± 23 | 249 ± 10 | 149 ± 2 | 37 ± 16 | 2 ± 0 | n/a | | | 8.63E+12 | |
| 1 | TOTM (87) ESO (13) | 95.0 ± 0.3 | | 40.5 | 1.24E+09 | 2356 ± 47 | 105 ± 3 | 108 ± 2 | 136 ± 4 | 101 ± 5 | 82 ± 2 | n/a | | | 4.61E+13 | |
| 2 | Ex 3 (87) ESO (13) | 93.3 ± 0.7 | | 54.3 | 7.71E+08 | 2172 ± 30 | 98 ± 3 | 189 ± 13 | 102 ± 3 | 82 ± 3 | 6 ± 2 | 94.7 | | | 5.43E+11 | |
| 2 | FP-8 (87) ESO (13) | 89.9 ± 0.5 | | 55.5 | 8.33E+08 | 2287 ± 146 | 94 ± 2 | 150 ± 3 | 86 ± 6 | 83 ± 11 | 19 ± 17 | 95.7 | | | 5.69E+11 | |
| 5 | ESO (100) | 92.9 ± 0.1 | | 32.7 | 1.26E+09 | 2464 ± 112 | 108 ± 4 | 233 ± 20 | 116 ± 2 | 98 ± 4 | 3 ± 0 | 96.1 | n/a | n/a | 7.72E+12 | |
| 6 | Ex 2 (87) ESO (13) | 96.1 ± 0.5 | | 61.7 | 1.13E+09 | 3104 ± 391 | 102 ± 24 | 99 ± 12 | 184 ± 48 | 83 ± 46 | 68 ± 19 | 97.9 | n/a | n/a | 3.51E+12 | |
| 6 | Ex2 (43.5) ESO (13) EPGD (43.5) | 95.6 ± 0.2 | | 44.2 | 1.24E+09 | 3723 ± 98 | 91 ± 12 | 96 ± 1 | 264 ± 12 | 81 ± 21 | 49 ± 5 | 96.3 | n/a | | 2.82E+12 | |
| 7 | Ex 4 (87) ESO (13) EPGD (0) | 96.1 ± 0.2 | | 64.5 | 6.97E+08 | 2024 ± 302 | 115 ± 23 | 101 ± 19 | 105 ± 44 | 90 ± 59 | 60 ± 18 | 98.1 | Heavy | Moderate | 1.16E+14 | |
| 7 | Ex 4 (50) ESO (13) | 94.5 ± 1.6 | | 48.1 | 1.12E+09 | 3579 ± 42 | 107 ± 13 | 95 ± 4 | 253 ± 6 | 91 ± 7 | 81 ± 8 | 99.7 | Slight | Slight | 3.86E+14 | |
| 7 | TOTM (50) DTDP (50) | 94.8 ± 0.2 | | 49.7 | 1.12E+09 | 3162 ± 435 | 110± 26 | 120± 31 | 184 ± 46 | 115 ± 56 | 82 ± 57 | 94.7 | None | None | 1.34E+15 | |
| 7 | Ex 4 (100) | 97.0 ± 0.3 | | 73.7 | 5.69E+08 | 1591 ± 130 | 103 ± 8 | 126 ± 16 | 56 ± 9 | 32 ± 17 | 100 ± 47 | 98.2 | Heavy | Moderate | 1.17E+14 | |

TABLE 5-continued

| Blend # | Plasticizer† | Shore (A) | Shore (D) | Tg | G' −20° C. | TS (Unaged) | TSR 113° C. | TSR 136° C. | TE (Unaged) | TER 113° C. | TER 136° C. | Wt Ret. | Spew 113° C. | Spew 136° C. | Vol Res | 5% Temp |
|---|---|---|---|---|---|---|---|---|---|---|---|---|---|---|---|---|
| 8 | TOTM (50) DTDP (50) | 94.5 ± 0.6 | | 45.0 | 1.16E+09 | 4152 ± 307 | 98 ± 8 | 105 ± 6 | 273 ± 4 | 108 ± 10 | 87 ± 10 | 94.8 | n/a | n/a | 1.21E+16 | |
| 8 | Ex 4 (50) ESO (50) | 94.2 ± 0.3 | | 46.9 | 9.75E+08 | 4042 ± 324 | 104 ± 8 | 97 ± 7 | 275 ± 12 | 119 ± 3 | 103 ± 4 | 99.8 | n/a | n/a | 3.92E+15 | |
| 9 | Pari 8 (25) ESO (75) | n/a | 35.3 ± 1.0 | n/a | n/a | 3621 ± 30 | 98 ± 1 | 99 ± 2 | 282 ± 5 | 101 ± 1 | 86 ± 1 | 99.7 | None | None | 4.95E+15 | |
| 10 | Ex 4 (50) ESO (50) | 94.7 ± 1.2 | 48.2 ± 0.6 | n/a | n/a | 3848 ± 83 | 104 ± 7 | 100 ± 3 | 256 ± 8 | 96 ± 13 | 43 ± 21 | 99.4 | Slight | Moderate | 5.88E+15 | |
| 10 | Ex 4 (50) S-N-S (50) | 92.0 ± 0.8 | 42.2 ± 0.3 | n/a | n/a | 3584 ± 208 | 114 ± 5 | 105 ± 13 | 258 ± 22 | 103 ± 7 | 67 ± 18 | 94.7 | None | None | 7.78E+15 | |
| 10 | Ex 4 (50) TOTM (50) | 94.9 ± 0.8 | 47.6 ± 0.4 | n/a | n/a | 3729 ± 172 | 110 ± 5 | 106 ± 4 | 224 ± 21 | 116 ± 14 | 87 ± 17 | 96.1 | None | None | 9.73E+15 | |
| 10 | Ex 4 (50) DINCH (50) | 94.2 ± 0.3 | 45.6 ± 0.7 | n/a | n/a | 3968 ± 155 | 119 ± 6 | 121 ± 8 | 274 ± 10 | 78 ± 5 | 65 ± 7 | 85.6 | None | None | 9.59E+15 | |
| 10A | Ex 4A (50) ESO (50) | n/a | 45.0 ± 0.5 | n/a | n/a | 3626 ± 211 | 99 ± 5 | 89 ± 8 | 251 ± 30 | 92 ± 5 | 51 ± 0 | 99.4 | n/a | n/a | 7.65E+15 | |

† = Weight percent for plasticiser componenets is shown in parenthesis.
Weight percent is based on total weight of the plasticize

TABLE 6

Time to Make Dry Blends

| Blend # | Plasticizer† | Time to Make Dry Blend (minutes) |
|---|---|---|
| 4 | Ex 2 (87) ESO (13) | 5.0 |
| 4 | TOTM (87) ESO (13) | 4.5 |
| 7 | Ex 4 (87) ESO (13) | 3.6 |
| 7 | Ex 4 (50) ESO (50) | 1.8 |
| 7 | TOTM (50) DTDP (50) | 3.9 |
| 7 | Ex 4 (100) | Still wet after 8 minutes |
| 8 | TOTM (50) DTDP (50) | 5.8 |
| 8 | Ex 4 (50) ESO (50) | 3.3 |

†= Weight percent for plasticizer components is shown in parenthesis. Weight percent is based on total weight of the plasticizer Plasticizer composition containing 50/50 weight percent Ex 4/ESO soaks into PVC more quickly than do the comparative plasticizers (50/50 weight percent TOTM/DTDP and 50/50 weight percent TOTM/ESO), as evident from Table 6. Increasing the amount of ESO in the plasticizer composition also contributes to a shorter soak time.

FIG. 1 is a plot showing the shear dependent viscosity at 200° C. of an embodiment of the present composition (87/13 wt % Example 2/ESO in Blend 4) compared to the plasticizer 87/13 wt % TOTM/ESO (in Blend 4). FIG. 1 illustrates that the present composition exhibits greater shear thinning than a comparative composition containing TOTM plasticizer.

TABLE 7

Volume Resistivity after Aging in 90° C. Water Bath

| Blend # | Plasticizer† | Volume Resistivity (Ohm cm) at 23° C. | | |
|---|---|---|---|---|
| | | 1 day | 3 days | 7 days |
| 7 | Ex 4 (87) ESO (13) | 2.35E+11 | 3.36E+13 | 1.68E+12 |
| 7 | Ex 4 (50) ESO (50) | 2.01E+14 | 2.01E+14 | 1.71E+14 |
| 7 | TOTM (50) DTDP (50) | 2.68E+14 | 2.68E+14 | 2.09E+14 |
| 7 | Ex 4 (100) | 5.85E+10 | 1.01E+09 | 1.52E+08 |
| 8 | TOTM (50) DTDP (50) | 2.45E+15 | 6.49E+15 | n/a |
| 8 | Ex 4 (50) ESO (50) | 1.90E+15 | 2.18E+15 | n/a |
| 10A | Ex 4A (50) ESO (50) | 3.18E+15 | 2.20E+15 | 1.10E+15 |

†= Weight percent for plasticizer components is shown in parenthesis. Weight percent is based on total weight of the plasticizer Increasing the amount of ESO in the exemplary plasticizers, results in a higher volume resistivity compared to the comparative samples, especially after aging in the 90° C. water bath (Table 7).

TABLE 8

Results from Wire Extrusion

| Blend # | Plasticizer† | Extruder RPM | Die Pressure (psi) | Surface Smoothness (μ in) | TS (Unaged)- psi | TSR 136° C. | TE (Unaged) - % | TER 136° C. |
|---|---|---|---|---|---|---|---|---|
| 4 | Ex 2 (87) ESO (13) | 14 | 940 | 156 ± 79 | 1771 ± 5 | 106 ± 3 | 40 ± 2 | 93 ± 7 |
| 4 | Ex 2 (87) ESO (13) | 40 | 1640 | 40 ± 12 | 2076 ± 8 | 133 ± 2 | 83 ± 2 | 92 ± 3 |
| 4 | TOTM (87) ESO (13) | 14 | 1820 | 82 ± 17 | 2368 ± 27 | 143 ± 2 | 63 ± 5 | 122 ± 8 |
| 8 | TOTM (50) DTDP (50) | 40 | 2470 | 71 ± 20 | 2234 ± 15 | 163 ± 1 | 46 ± 4 | 122 ± 56 |
| 8 | Ex 4 (50) ESO (50) | 40 | 2500 | 24 ± 8 | 2003 ± 3 | 124 ± 4 | 63 ± 6 | 118 ± 16 |
| 10A | Ex 4A (50) ESO (50) | 40 | 1640 | 40 ± 17 | 2461 ± 34 | 130 ± 4 | 82 ± 9 | 84 ± 15 |

† = Weight percent for plasticizer components is shown in parenthesis. Weight percent is based on total weight of the plasticizer

TABLE 8A

Wet Insulation Resistance (Megaohms/1000 ft) at 75° C. of Extruded Wire

| Blend # | Plasticizer† | Days in Water | | | | | | | | | | | | | | | |
|---|---|---|---|---|---|---|---|---|---|---|---|---|---|---|---|---|---|
| | | 0.25 | 7 | 14 | 21 | 28 | 35 | 42 | 49 | 56 | 63 | 70 | 77 | 84 | 91 | 98 | 105 |
| 10A | Ex 4A (50) ESO (50) | 0.457 | 0.716 | 0.589 | 0.569 | 0.405 | 0.556 | 0.550 | 0.525 | 0.479 | 0.504 | 0.505 | 0.458 | 0.389 | 0.412 | 0.400 | 0.428 |

TABLE 8A-continued

Wet Insulation Resistance (Megaohms/1000 ft) at 75° C. of Extruded Wire

| | | Days in Water | | | | | | | | | | | | | |
|---|---|---|---|---|---|---|---|---|---|---|---|---|---|---|---|
| Blend # | Plasticizer† | 112 | 119 | 126 | 133 | 140 | 146 | 153 | 160 | 167 | 174 | 181 | 188 | 195 | 202 | 209 |
| 10A | Ex 4A (50) ESO (50) | 0.420 | 0.424 | 0.416 | 0.051 | 1.410 | 0.422 | 0.424 | 0.431 | 0.419 | 0.373 | 0.385 | 0.381 | 0.385 | 0.383 | 0.392 |

† = Weight percent for plasticizer components is shown in parenthesis.
Weight percent is based on total weight of the plasticizer Compared to the comparative samples, the exemplary plasticizers containing ESO result in (1) smooth cable coating with (2) excellent retention of tensile properties after heat aging at 136° C., as evident from Table 8. Furthermore, exemplary plasticizer containing ESO results in excellent electrical properties (Table 8A). In particular, the long-term wet insulation resistance of the wire is excellent, well above the minimum pass requirement of 0.115 Megaohms/1000 ft and passing the stability criteria of less than 2% decrease per week in insulation resistance after 24 weeks.

C. Effect of Castor Wax Grade on Acetylated Castor Component

Examples 6 to 10

Effect of Castor Wax Grade on Color and Insolubles Content of Acetylated Castor Wax at Room Temperature Acetylation is done on five different grades of castor wax (CW6, CW7, CW8, CW9, CW10). The castor wax materials are obtained from different suppliers, and used in the acetylation reaction as received. 75 g of each castor wax sample is put into a 250 mL three-necked flask equipped with a stirring bar, a condenser, a thermometer and an additional funnel. The mixture is covered under nitrogen. The solid starting material is melted at 85-95° C. To this mixture, 25 g of acetic anhydride is slowly added via additional funnel at 100° C. The mixture is kept at this temperature for 17 hours. The resulting acetylated mixture is cooled to 75° C. The condenser is replaced by distillation head (short path). The excess of acetic anhydride and by-product acetic acid are removed under vacuum (using a vacuum pump, ~10-30 mm Hg). The reaction mixture is heated slowly to 100° C. Total distillation time is 5-6 hours. The products, acetylated castor wax samples ACW6, ACW7, ACW8, ACW9, ACW10, are cooled to room temperature and discharged from the flask when the distillation is completed. The results are summarized in Table 9. Color is measured using Color Quest XE from HunterLab. Acid number is measured using 0.1 N KOH/MeOH, 50/50 xylenes/isopropanol, and phenolphthalein as indicator. Table 9 shows that the starting castor wax material plays a very important role in product color and formation of insolubles (haze). The products ACW6-ACW10 exhibit differences in terms of color and haze formation based on the supplier/grade of the starting castor wax.

TABLE 9

Effect of castor wax grade on color and haze (insolubles content) of ACW

| Material | Acid number of Starting Castor Wax (mg KOH/g) | Color (APHA-20 mm) | Acid number (mg KOH/g) | Haze (Insolubles) Formed @ 22° C. |
|---|---|---|---|---|
| ACW6 | 1.2 | 288 | 0.3 | None |
| ACW7 | 2.2 | 390 | 0.5 | High |
| ACW8 | 1.5 | 409 | 0.4 | None |
| ACW9 | 1.9 | 741 | 0.4 | Low |
| ACW10 | 1.5 | 279 | 0.4 | None |

D. Purification of Castor Wax by Re-crystallization to Decrease Color and Insolubles Content of Acetylated Castor Component Examples 11 to 13

Purification of Castor Wax, by Re-Crystallization from Ethyl Acetate or Acetone, as a Means of Decreasing Color and Insolubles Content of Acetylated Castor Wax (ACW11, ACW12, ACW13)

The starting material (castor wax) is recrystallized from ethyl acetate or acetone before use in the acetylation reaction. Re-crystallization of the castor wax improves the color of the acetylated castor wax and results in lighter color. ACW11 and ACW12 have a lower APHA value than non-recrystallized ACW6. Similarly, ACW13 has a lower APHA value than non-recrystallized ACW7. The results are shown in Table 10.

TABLE 10

Recrystallization of castor wax starting material as a way to decrease color and insolubles content of ACW

| Starting Material (Castor Wax) | Acetylated Material | Color (APHA-20 mm) | Acid number (mg KOH/g) | Haze (Insolubles) Formation @ 22° C. |
|---|---|---|---|---|
| CW6--As received | ACW6 | 288 | 0.3 | None |
| CW6 recrystallized 1x from acetone | ACW11 | 253 | Not Measured | None |
| CW6 recrystallized 2x from acetone | ACW12 | 247 | Not Measured | None |
| CW7--As received | ACW7 | 390 | 0.5 | High |
| CW7 recrystallized 1x from ethyl acetate | ACW13 | 286 | Not Measured | Medium |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A coated conductor comprising:
   a conductor; and
   a coating on the conductor, the coating comprising a polymeric resin and a plasticizer composition comprising an acetylated castor component and a second plasticizer comprising an epoxidized fatty acid ester.

2. The coated conductor of claim 1 wherein the acetylated castor component is an acetylated castor oil having a hydroxyl number from 0 to less than 5 as measured in accordance with DIN 53402.

3. The coated conductor of claim 1 wherein the acetylated castor component is an acetylated castor wax having a viscosity less than 2000 m Pa as measured in accordance with ASTM D445 at 25° C.

4. The coated conductor of claim 1 wherein the plasticizer composition comprises less than 70 wt % of the acetylated castor component.

5. The coated conductor of claim 1 wherein the acetylated castor component is selected from the group consisting of acetylated castor oil, acetylated castor wax, and combinations thereof.

6. The coated conductor of claim 1 wherein the second plasticizer comprises an epoxidized soybean oil.

7. The coated conductor of claim 6 wherein the polymeric resin is a vinyl chloride resin.

8. The coated conductor of claim 7 wherein the polymeric resin and the plasticizer composition form a polymeric composition, the polymeric composition comprising from 30 wt % to 70 wt % polyvinyl chloride and from 70 wt % to 30 wt % plasticizer composition.

9. The coated conductor of claim 1 wherein the acetylated castor component has a hydroxyl number from 0 to less than 5.

10. The coated conductor of claim 1 wherein the plasticizer composition has a solution temperature from 140° C. to 200° C.

11. The coated conductor of claim 1 wherein polymeric resin and the plasticizer composition form a polymeric composition, the polymeric composition having a tensile strength retention greater than 70% after 168 hours heat aging at 113° C. as measured in accordance with ASTM D 638.

12. The coated conductor of claim 1 wherein polymeric resin and the plasticizer composition form a polymeric composition, the polymeric composition having a tensile strength retention greater than 70% after 168 hours heat aging at 136° C. as measured in accordance with ASTM D 638.

13. The coated conductor of claim 1 wherein the polymeric resin and the plasticizer composition form a polymeric composition, the polymeric composition having a tensile elongation retention greater than 30% after 168 hours heat aging at 113° C. as measured in accordance with ASTM D 638.

14. The coated conductor of claim 1 wherein the polymeric resin and the plasticizer composition form a polymeric composition, the polymeric composition having a tensile elongation retention greater than 30% after 168 hours heat aging at 136° C. as measured in accordance with ASTM D 638.

15. The coated conductor of claim 1 wherein the coated conductor passes the heat test as measured in accordance with UL-1581.

* * * * *